US009906909B2

(12) United States Patent
Sahadi et al.

(10) Patent No.: US 9,906,909 B2
(45) Date of Patent: Feb. 27, 2018

(54) MAP BASED BEACON MANAGEMENT

(71) Applicant: Blazer and Flip Flops, Inc., San Diego, CA (US)

(72) Inventors: Scott Sebastian Sahadi, Solana Beach, CA (US); Benjamin Harry Ziskind, San Diego, CA (US); Joshua David Bass, Carlsbad, CA (US); Benjamin Keeling Mathews, Orlando, FL (US)

(73) Assignee: BLAZER AND FLIP FLOPS, INC., San Diego, CA (US)

( * ) Notice: Subject to any disclaimer, the term of this patent is extended or adjusted under 35 U.S.C. 154(b) by 0 days.

(21) Appl. No.: 15/144,359

(22) Filed: May 2, 2016

(65) Prior Publication Data
US 2016/0323708 A1     Nov. 3, 2016

Related U.S. Application Data (60) Provisional application No. 62/155,889, filed on May 1, 2015.

(51) Int. Cl.
| | | |
|---|---|---|
| *H04W 4/02* | (2018.01) | |
| *G01S 1/02* | (2010.01) | |
| *G01S 5/14* | (2006.01) | |

(52) U.S. Cl.
CPC .............. *H04W 4/023* (2013.01); *G01S 1/02* (2013.01); *G01S 5/14* (2013.01)

(58) Field of Classification Search
CPC ....... H04W 4/023; H04W 4/02; H04W 40/24; H04W 40/244; H04W 16/00;
(Continued)

(56) References Cited

U.S. PATENT DOCUMENTS

| | | |
|---|---|---|
| 4,873,513 A | 10/1989 | Soults et al. |
| 5,978,744 A | 11/1999 | McBride |

(Continued)

FOREIGN PATENT DOCUMENTS

| | | |
|---|---|---|
| WO | WO 2011/115855 | 9/2011 |
| WO | WO 2011/159811 | 12/2011 |

(Continued)

OTHER PUBLICATIONS

U.S. Appl. No. 14/633,019 Final Office Action dated Nov. 10, 2016.
(Continued)

*Primary Examiner* — Meless Zewdu
(74) *Attorney, Agent, or Firm* — Polsinelli LLP (57) ABSTRACT

Once a proximity beacon is installed within a venue, mobile devices receive signals transmitted by the proximity beacon. These mobile devices then report their own locations to an application server. These mobile devices also report a signal strength to the application server, the signal strength associated with the signal from the proximity beacon. The application server determines the location of the proximity beacon by triangulating based on the locations of the mobile devices and on the signal strengths from the mobile devices. The location of the proximity beacon is then transmitted to a front-end device that then displays the location of the proximity beacon on a map along with other locations of other proximity beacons. The map may also display range areas and battery levels of the proximity beacon, and any other data that can be gathered by the application server from the mobile devices or the proximity beacon.

18 Claims, 7 Drawing Sheets

(58) Field of Classification Search
CPC ... H04W 16/20; H04W 16/225; H04W 4/008; H04W 4/021; H04W 4/025; G01S 5/0252; G01S 1/00; G01S 5/02; G01S 1/02; G01S 5/00; G01S 5/30; G01S 5/14; G01S 1/022; G01S 1/024; G01S 19/01; G01S 5/0009; G01S 5/0018; G01S 5/0027; G01S 5/0036; G01S 5/0045; G01S 5/0054; G01S 5/0063; G01S 5/0242; G01S 1/047; G01S 1/06; H04B 10/1149; H04B 10/1143; H04M 1/7253

See application file for complete search history.

(56) References Cited

U.S. PATENT DOCUMENTS

| | | | |
|---|---|---|---|
| 6,142,368 | A | 11/2000 | Mullins et al. |
| 6,223,559 | B1 | 5/2001 | Coleman |
| 6,320,496 | B1 | 11/2001 | Sokoler et al. |
| 6,352,205 | B1 | 3/2002 | Mullins et al. |
| 6,369,840 | B1 | 4/2002 | Barnett et al. |
| 6,414,635 | B1 | 7/2002 | Stewart et al. |
| 6,474,557 | B2 | 11/2002 | Mullins et al. |
| 6,493,630 | B2 | 12/2002 | Ruiz et al. |
| 6,587,787 | B1 * | 7/2003 | Yokota ............... G01C 21/36 701/455 |
| 6,663,006 | B2 | 12/2003 | Mullins et al. |
| 6,687,608 | B2 | 2/2004 | Sugimoto et al. |
| 6,997,380 | B2 | 2/2006 | Safael et al. |
| 7,222,080 | B2 | 5/2007 | Hale et al. |
| 7,558,678 | B2 | 7/2009 | Jones |
| 7,992,773 | B1 | 8/2011 | Rothschild |
| 8,368,695 | B2 | 2/2013 | Howell et al. |
| 8,424,752 | B2 | 4/2013 | Rothschild |
| 8,427,510 | B1 | 4/2013 | Towfiq et al. |
| 8,433,342 | B1 | 4/2013 | Boyle et al. |
| 8,625,796 | B1 | 1/2014 | Ben Ayed |
| 8,651,369 | B2 | 2/2014 | Rothschild |
| 8,936,190 | B2 | 1/2015 | Rothschild |
| 9,264,849 | B1 | 2/2016 | Kahn et al. |
| 9,485,322 | B2 | 11/2016 | Krishnaswamy et al. |
| 9,488,085 | B2 | 11/2016 | Crawford et al. |
| 9,741,022 | B2 | 8/2017 | Ziskind |
| 9,813,855 | B2 | 11/2017 | Sahadi |
| 9,829,339 | B2 | 11/2017 | Bass |
| 2002/0029226 | A1 | 3/2002 | Li et al. |
| 2002/0055863 | A1 | 5/2002 | Behaylo |
| 2002/0194246 | A1 | 12/2002 | Moskowitz et al. |
| 2003/0007464 | A1 | 1/2003 | Balani |
| 2004/0224703 | A1 | 11/2004 | Takaki et al. |
| 2005/0114014 | A1 | 5/2005 | Isaac |
| 2006/0074550 | A1 | 4/2006 | Freer et al. |
| 2006/0087474 | A1 | 4/2006 | Do et al. |
| 2006/0106850 | A1 | 5/2006 | Morgan et al. |
| 2007/0032269 | A1 | 2/2007 | Shostak |
| 2007/0118415 | A1 | 5/2007 | Chen et al. |
| 2007/0174115 | A1 | 7/2007 | Chieu et al. |
| 2007/0197247 | A1 | 8/2007 | Inselberg |
| 2007/0270166 | A1 | 11/2007 | Hampel et al. |
| 2008/0059889 | A1 | 3/2008 | Parker et al. |
| 2008/0183582 | A1 | 7/2008 | Major |
| 2008/0186164 | A1 | 8/2008 | Emigh et al. |
| 2008/0290182 | A1 | 11/2008 | Bell et al. |
| 2008/0306826 | A1 | 12/2008 | Kramer et al. |
| 2008/0312946 | A1 | 12/2008 | Valentine et al. |
| 2009/0017798 | A1 | 1/2009 | Pop |
| 2009/0027418 | A1 | 1/2009 | Maru et al. |
| 2009/0089131 | A1 | 4/2009 | Moukas et al. |
| 2009/0265428 | A1 | 10/2009 | Light et al. |
| 2009/0319306 | A1 | 12/2009 | Chanick |
| 2009/0319616 | A1 | 12/2009 | Lewis et al. |
| 2010/0037141 | A1 | 2/2010 | Carter et al. |
| 2010/0042320 | A1 | 2/2010 | Salmre et al. |
| 2010/0077036 | A1 | 3/2010 | DeLuca et al. |
| 2010/0161432 | A1 | 6/2010 | Kumanov et al. |
| 2010/0194784 | A1 | 8/2010 | Hoff et al. |
| 2011/0054976 | A1 | 3/2011 | Adler et al. |
| 2011/0078026 | A1 | 3/2011 | Durham |
| 2011/0090123 | A1 | 4/2011 | Sridhara et al. |
| 2011/0136507 | A1 | 6/2011 | Hauser et al. |
| 2011/0173545 | A1 | 7/2011 | Meola |
| 2011/0221745 | A1 | 9/2011 | Golman et al. |
| 2011/0231235 | A1 | 9/2011 | MacIlwaine et al. |
| 2011/0246148 | A1 | 10/2011 | Gupta et al. |
| 2011/0267369 | A1 | 11/2011 | Olsen et al. |
| 2012/0024947 | A1 | 2/2012 | Naelon |
| 2012/0069131 | A1 | 3/2012 | Abelow |
| 2012/0081250 | A1 | 4/2012 | Farrokhi et al. |
| 2012/0096490 | A1 | 4/2012 | Barnes |
| 2012/0166960 | A1 | 6/2012 | Salles |
| 2012/0172055 | A1 | 7/2012 | Edge |
| 2012/0197720 | A1 | 8/2012 | Bezancon et al. |
| 2012/0214515 | A1 | 8/2012 | Davis et al. |
| 2012/0239504 | A1 | 9/2012 | Curlander et al. |
| 2012/0270573 | A1 | 10/2012 | Marti et al. |
| 2012/0271691 | A1 | 10/2012 | Hammad et al. |
| 2012/0274642 | A1 | 11/2012 | Ofek et al. |
| 2012/0284117 | A1 | 11/2012 | Karandikar |
| 2013/0024265 | A1 | 1/2013 | Lotzof |
| 2013/0036455 | A1 | 2/2013 | Bodi et al. |
| 2013/0052990 | A1 | 2/2013 | Zhang |
| 2013/0059603 | A1 | 3/2013 | Guenec et al. |
| 2013/0085834 | A1 | 4/2013 | Witherspoon et al. |
| 2013/0132230 | A1 | 5/2013 | Gibson et al. |
| 2013/0137464 | A1 | 5/2013 | Kramer et al. |
| 2013/0157655 | A1 | 6/2013 | Smith et al. |
| 2013/0158867 | A1 | 6/2013 | Sidhu et al. |
| 2013/0173377 | A1 | 7/2013 | Keller et al. |
| 2013/0173393 | A1 | 7/2013 | Calman et al. |
| 2013/0191213 | A1 | 7/2013 | Beck et al. |
| 2013/0225282 | A1 | 8/2013 | Williams et al. |
| 2013/0231135 | A1 | 9/2013 | Garskof |
| 2013/0267260 | A1 | 10/2013 | Chao et al. |
| 2013/0281084 | A1 | 10/2013 | Batada et al. |
| 2013/0317944 | A1 | 11/2013 | Huang et al. |
| 2013/0339073 | A1 | 12/2013 | Dabbiere |
| 2014/0025466 | A1 | 1/2014 | Borton et al. |
| 2014/0058766 | A1 | 2/2014 | Yu et al. |
| 2014/0067544 | A1 | 3/2014 | Klish et al. |
| 2014/0073363 | A1 | 3/2014 | Tidd et al. |
| 2014/0082509 | A1 | 3/2014 | Roumeliotis et al. |
| 2014/0118113 | A1 | 5/2014 | Kaushik et al. |
| 2014/0122040 | A1 | 5/2014 | Marti |
| 2014/0128103 | A1 | 5/2014 | Joao et al. |
| 2014/0129266 | A1 | 5/2014 | Perl et al. |
| 2014/0162693 | A1 | 6/2014 | Wachter et al. |
| 2014/0164761 | A1 | 6/2014 | Kufluk et al. |
| 2014/0188614 | A1 | 7/2014 | Badenhop |
| 2014/0207509 | A1 | 7/2014 | Yu et al. |
| 2014/0228060 | A1 | 8/2014 | Abhyanker |
| 2014/0244332 | A1 | 8/2014 | Mermelstein |
| 2014/0253383 | A1 * | 9/2014 | Rowitch ............... G01S 1/02 342/386 |
| 2014/0256357 | A1 | 9/2014 | Wang et al. |
| 2014/0257991 | A1 | 9/2014 | Christensen et al. |
| 2014/0278054 | A1 | 9/2014 | Tidd et al. |
| 2014/0292481 | A1 | 10/2014 | Dumas et al. |
| 2014/0342760 | A1 | 11/2014 | Moldavsky et al. |
| 2015/0035644 | A1 | 2/2015 | June et al. |
| 2015/0038171 | A1 | 2/2015 | Uilecan et al. |
| 2015/0052460 | A1 | 2/2015 | Mohammad Mirzaei et al. |
| 2015/0058133 | A1 | 2/2015 | Roth et al. |
| 2015/0080014 | A1 | 3/2015 | Ben-Yosef et al. |
| 2015/0100398 | A1 | 4/2015 | Narayanaswami et al. |
| 2015/0127445 | A1 | 5/2015 | Jaffee |
| 2015/0154674 | A1 | 6/2015 | Todasco |
| 2015/0176997 | A1 | 6/2015 | Pursche et al. |
| 2015/0181384 | A1 * | 6/2015 | Mayor ............... H04W 24/02 455/456.1 |
| 2015/0222935 | A1 | 8/2015 | King et al. |
| 2015/0233715 | A1 | 8/2015 | Xu et al. |
| 2015/0237473 | A1 | 8/2015 | Koepke |
| 2015/0241238 | A1 | 8/2015 | Bass |
| 2015/0242890 | A1 | 8/2015 | Bass et al. |

(56) References Cited

U.S. PATENT DOCUMENTS

| | | |
|---|---|---|
| 2015/0244725 A1 | 8/2015 | Ziskind |
| 2015/0262086 A1 | 9/2015 | Mader et al. |
| 2015/0262216 A1 | 9/2015 | Aziz et al. |
| 2015/0296347 A1* | 10/2015 | Roth .................... G06Q 50/205 705/326 |
| 2015/0334569 A1* | 11/2015 | Rangarajan ......... H04W 64/003 726/4 |
| 2015/0334676 A1* | 11/2015 | Hart ..................... H04W 64/00 455/456.1 |
| 2016/0005003 A1 | 1/2016 | Norris et al. |
| 2016/0050526 A1* | 2/2016 | Liu ....................... H04W 4/021 455/457 |
| 2016/0063537 A1 | 3/2016 | Kumar |
| 2016/0105644 A1 | 4/2016 | Smith et al. |
| 2016/0127351 A1 | 5/2016 | Smith et al. |
| 2016/0150370 A1 | 5/2016 | Gillespie et al. |
| 2016/0242010 A1 | 8/2016 | Parulski et al. |
| 2016/0300192 A1 | 10/2016 | Zamer |
| 2016/0316324 A1 | 10/2016 | Sahadi |
| 2016/0321548 A1 | 11/2016 | Ziskind |
| 2017/0010119 A1 | 1/2017 | Bass |
| 2017/0011348 A1 | 1/2017 | Ziskind |
| 2017/0162006 A1 | 6/2017 | Sahadi |
| 2017/0248438 A1 | 8/2017 | Bass |
| 2017/0372270 A1 | 12/2017 | Ziskind |

FOREIGN PATENT DOCUMENTS

| | | |
|---|---|---|
| WO | WO 2013/163444 | 10/2013 |
| WO | WO 2015/017442 | 2/2015 |
| WO | WO 2015/130969 | 9/2015 |
| WO | WO 2015/130971 | 9/2015 |
| WO | WO 2016/172731 | 10/2016 |
| WO | WO 2016/176506 | 11/2016 |
| WO | WO 2016/179098 | 11/2016 |

OTHER PUBLICATIONS

Feng et al., Yue ; "Effective venue image retrieval using robust feature extraction and model constrained matching for mobile robot localization", Machine Vision and Applications, DOI 10.1007/ 500138-011-0350-z, Oct. 28, 2010.

Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (PacificVis), 2014 IEEE*, pp. 193-200.IEEE, 2014.

Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2015/017827, International Search Report and Written Opinion dated Jun. 11, 2015.
PCT Application No. PCT/US2015/017829, International Search Report and Written Opinion dated Jun. 8, 2015.
U.S. Appl. No. 14/632,872 Office Action dated Mar. 7, 2016.
U.S. Appl. No. 14/633,019 Office Action dated May 6, 2016.
PCT Application No. PCT/US2016/029260, International Search Report and Written Opinion dated Jul. 27, 2016.
PCT Application No. PCT/US2016/029880, International Search Report and Written Opinion dated Jul. 27, 2016.
PCT Application No. PCT/US2016/030424, International Search Report and Written Opinion dated Jul. 29, 2016.
U.S. Appl. No. 15/383,710, Scott S. Sahadi, Wearable Device, filed Dec. 19, 2016.
PCT/US16/67582, Wearable Device, Dec. 19, 2016.
U.S. Appl. No. 15/271,087 Office Action dated Jun. 7, 2017.
U.S. Appl. No. 15/597,609 Office Action dated Jul. 10, 2017.
U.S. Appl. No. 14/632,884 Office Action dated May 19, 2017.
PCT Application No. PCT/US2016/067582, International Search Report and Written Opinion dated Mar. 17, 2017.
U.S. Appl. No. 14/633,015 Office Action dated Apr. 13, 2017.
U.S. Appl. No. 15/138,157 Office Action dated Mar. 9, 2017.
U.S. Appl. No. 14/633,015, Benjamin H. Ziskind, Venue Notifications, filed Feb. 26, 2015.
U.S. Appl. No. 15/138,157, Scott S. Sahadi, Targeted Venue Message Distribution, filed Apr. 25, 2016.
PCT/US16/29260, Targeted Venue Message Distribution, Apr. 25, 2016.
PCT/US16/30424, Map Based Beacon Management, May 2, 2016.
U.S. Appl. No. 15/141,780, Benjamin H. Ziskind, Intelligent Prediction of Queue Wait Times, filed Apr. 28, 2016.
PCT/US16/29880, Intelligent Prediction of Queue Wait Times, Apr. 28, 2016.
U.S. Appl. No. 15/597,609, Joshua D. Bass, Live Branded Dynamic Mapping, filed May 7, 2017.
U.S. Appl. No. 15/683,620, Benjamin H. Ziskind, Parental Controls, filed Aug. 22, 2017.
U.S. Appl. No. 15/383,710 Office Action dated Aug. 16, 2017.
U.S. Appl. No. 15/805,014, Scott S. Sahadi, Targeted Venue Message Distribution, filed Nov. 6, 2017.
U.S. Appl. No. 14/632,884 Final Office Action dated Dec. 1, 2017.
U.S. Appl. No. 14/633,015 Final Office Action dated Dec. 28, 2017.

\* cited by examiner

MAP BASED BEACON MANAGEMENT

CROSS-REFERENCE TO RELATED APPLICATIONS

The present application claims the priority benefit of U.S. provisional application No. 62/155,889 filed May 1, 2015 and entitled "Map Based Beacon Management," which is hereby incorporated by reference.

BACKGROUND

1. Field of the Invention

The present invention generally concerns beacon management. More particularly, the present invention concerns locating beacons via location data of nearby mobile devices in proximity range of the beacon.

2. Description of the Related Art

Entertainment and event venues such as theme parks, cruise ships, universities, arenas, concert venues, ski resorts, relaxation resorts, ice rinks, spas, skate parks, and stadiums typically have large numbers of visitors/guests. These venues typically have multiple "points of interest," that correspond to locations of attractions, landmarks, or other noteworthy areas. Attraction points of interest may include locations associated with restaurants, cafeterias, concession stands, stores, libraries, theme park rides, pools, theatre shows, movies circus shows, animal shows, or costumed characters. Landmark points of interest may include locations associated with statues, sculptures, structures, trees, paintings, gardens, buildings, or natural formations. Other points of interest may include locations associated with restrooms, water fountains, entrances, exits, or crossroads. An area such as an attraction or a restroom may be associated with multiple points of interest. For example, a given area may correspond to a number of entrances and exits or to multiple points of sale such as cashiers or card readers.

Mobile devices, such as cellular phones or wearable devices, can interact with location services such as Global Positioning System (GPS) satellites via a GPS receiver. Data from such a GPS receiver can be requested by an operating system of a mobile device, and can also be requested by third-party applications executed by the mobile device. Likewise, location can be detected via cellular signal triangulation and requested by an operating system or third-party application. Location detection via GPS receiver or cellular signal triangulation typically does not function well indoors or in the vicinity of buildings, structures such as amusement park rides, or trees.

Proximity beacons can better track locations of mobile devices in indoor locations or locations near tall buildings, structures, or trees. Proximity beacons typically broadcast wireless signals that can be detected by nearby mobile devices. Some proximity beacons have hardware necessary for a private network or Internet connection. Proximity beacons with such connectivity hardware may then report directly to an administrator device regarding which mobile devices the proximity beacon detected nearby. Other proximity beacons lack hardware necessary for a private network or Internet connection. Such a proximity beacon typically relies on mobile devices in range of the proximity beacon to report to the administrator device that the proximity beacon was detected by the mobile device.

Proximity beacons typically do not have GPS receivers installed because they are typically built to be as inexpensive and energy-efficient as possible. Thus, each proximity beacon is typically unable to detect its own location. Because of this, administrators must typically manually input a location for the proximity beacon and trust that the proximity beacon is located where they think it is located, and further must trust that the proximity beacon was not accidentally or intentionally moved. Administrators receiving data identifying mobile devices in the proximity of a proximity beacon that has moved, such as a proximity beacon affixed to a moving object, cannot reliably know where those mobile devices actually are. Without being able to reliably locate each proximity beacon, administrators must expend time and energy manually organizing data from their various proximity beacons to understand which data corresponds to which proximity beacon, and where different mobile devices must therefore be, which can be increasingly confusing as the number and density of proximity beacons in the venue increases.

Thus, there is a need in the art for an improved way of determining proximity beacon locations and managing beacon proximity data.

SUMMARY OF THE PRESENTLY CLAIMED INVENTION

A first claimed embodiment of the present invention involves a method for beacon management. The method includes receiving mobile device location information and proximity information from a mobile device within range of a proximity beacon. The mobile device location information identifies a location of the mobile device. The proximity information identifies a signal strength of a signal that the mobile device received from the proximity beacon. The method also includes identifying a location of the proximity beacon within a venue based on the received location information and the received proximity information, and transmitting the location of the proximity beacon to a front-end device, thereby displaying the location of the proximity beacon overlaid over a map displayed via a display of the front-end device.

A second claimed embodiment of the present invention involves a system for beacon management. The system includes a communication receiver that receives mobile device location information and proximity information from a mobile device within range of a proximity beacon. The mobile device location information identifies a location of the mobile device. The proximity information identifies a signal strength of a signal that the mobile device received from the proximity beacon. The system also includes a memory and a processor, the coupled to the memory and to the communication transceiver. Execution of instructions stored in the memory by the processor identifies a location of the proximity beacon within a venue based on the received location information and the received proximity information and transmits the location of the proximity beacon to a front-end device, thereby displaying the location of the proximity beacon overlaid over a map displayed via a display of the front-end device A third-claimed embodiment of the present invention concerns a non-transitory computer-readable storage medium having embodied thereon a program executable by a processor to perform a method for beacon management. The method includes receiving mobile device location information and proximity information from a mobile device within range of a proximity beacon. The mobile device location information identifies a location of the mobile device. The proximity information identifies a signal strength of a signal that the mobile device received from the proximity beacon. The method also includes identifying a location of the proximity beacon within a venue based on the received location information and the received proximity information, and transmitting the location of the proximity beacon to a front-end device, thereby displaying the location of the proximity beacon overlaid over a map displayed via a display of the front-end device.

DETAILED DESCRIPTION

Once a proximity beacon is installed within a venue, mobile devices receive signals transmitted by the proximity beacon. These mobile devices then report their own locations to an application server. These mobile devices also report a signal strength to the application server, the signal strength associated with the signal from the proximity beacon. The application server determines the location of the proximity beacon by triangulating based on the locations of the mobile devices and on the signal strengths from the mobile devices. The location of the proximity beacon is then transmitted to a front-end device that then displays the location of the proximity beacon on a map along with other locations of other proximity beacons. The map may also display detection range areas and battery levels of the proximity beacon, and any other data that can be gathered by the application server from the mobile devices or the proximity beacon.

Figure 1:
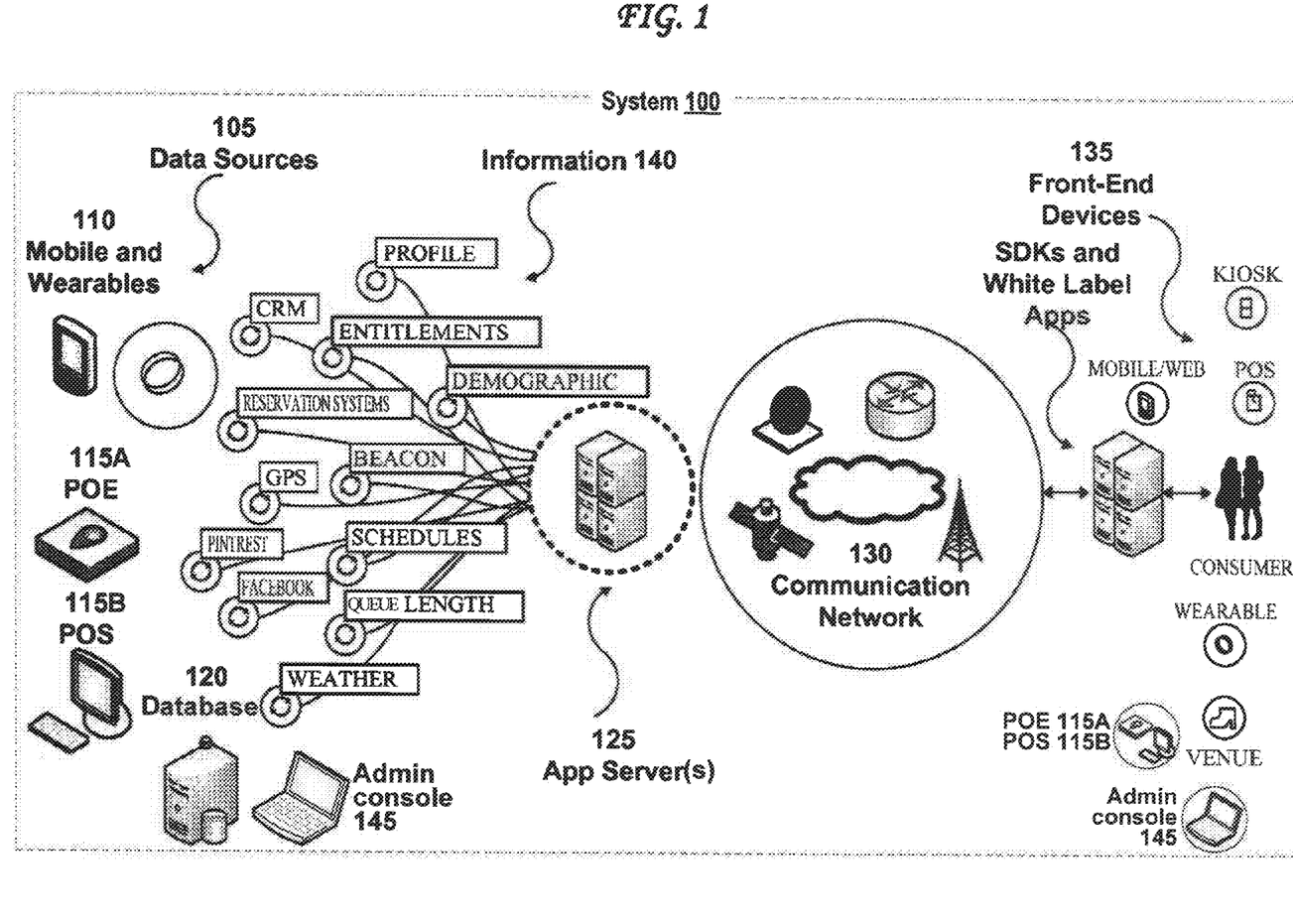
FIG. 1 is a block diagram of a beacon data ecosystem.

FIG. 1 is a block diagram of a beacon data ecosystem 100. The beacon data ecosystem 100 may be used within a venue with multiple points of interest. The venue may be an entertainment venue or an event venue, which may include a theme park, a cruise ship, a school, a university, an arena, a concert venue, a ski resort, a relaxation resort, an ice rink, a shopping mall, a spa, a skate park, or a stadium. The points of interest of the venue may identify locations associated with attractions, landmarks, or other noteworthy areas. Attraction points of interest may include locations associated with restaurants, cafeterias, concession stands, stores, libraries, theme park rides, pools, theatre shows, movies circus shows, animal shows, or costumed characters. Landmark points of interest may include locations associated with statues, sculptures, structures, trees, paintings, gardens, buildings, or natural formations. Other points of interest may include locations associated with restrooms, water fountains, entrances, exits, or crossroads. An area such as an attraction or a restroom may be associated with multiple points of interest. For example, a given area may correspond to a number of entrances and exits or to multiple points of sale such as cashiers or card readers.

The beacon data ecosystem 100 illustrated in FIG. 1 centers around one or more application server(s) 125. These application server(s) 125 obtain information 140 from one or more data source(s) 105, such as mobile devices 110 in proximity range of one or more proximity beacon(s). The application server(s) 125 then determine the location of each of the proximity beacons based at least on information 140 from one or more mobile device(s) 110 in range of the proximity beacon. In particular, the application server(s) 125 determine the location of each proximity beacon based on location data of mobile device(s) 110 in range of the proximity beacon and based on a signal strength measurement value associated with one or more signals transmitted between the proximity beacon and each mobile device in range of the proximity beacon. The one or more signals may include signals transmitted by the proximity beacon and received by the mobile device(s) 110 and/or signals transmitted by the mobile device(s) 110 and received by the proximity beacon. Other information 140, such as manually reported beacon location information, may also be factored into the location of each proximity beacon as determined by the application server(s) 125. Once the location of each proximity beacon is determined by the application server(s) 125, these locations are transmitted from the application server(s) 125 to one or more front-end device(s) 135 via communication network 130.

The application server(s) 125 and data source(s) 105 may be located within or outside the entertainment venue. The front-end devices 135 receiving the proximity beacon location data are generally located within the venue, but in some cases may be located outside of the venue. For example, a mobile device 110 may be associated with a guest who is about to enter the venue. Similarly, a mobile device 110 may be associated with a staff member who is working remotely or on the outside perimeter of the venue.

The data sources 105 may include mobile devices 110 (including wearable devices), point-of-entry (POE) or point-of-exit (POE) terminals/beacons 115A, point-of-service (POS) terminals 115B, database(s) 120, or administrator console(s) 145. Point of service terminals 115B may include cash registers, credit card readers, electronic payment receivers, or some combination thereof. The information 140 provided by these data sources 105 generally includes location data provided by the mobile devices 110 or point-of-service terminals 115B, as well as proximity data identifying which mobile devices 110 or point-of-service terminals 115B are within a detection range area of each proximity beacon. Proximity beacons may include, but are not limited to, point of entry beacons 115A or point of exit beacons 115A.

The information 140 may also include social media data related to Facebook, Twitter, Instagram, Pinterest, Tumblr, or other social media accounts. Such social media data may include profile information, friend information, photos, message information, or some combination thereof. The information 140 may also include login information, guest settings, guest disability information, guest reservation status information, guest demographic information, entitlement information, customer relationship management (CRM) software information, weather information, queue length information, or some combination thereof.

The information 140 may also include input from an administrator console 145, for example identifying an estimated location of one or more of the proximity beacons. The application server(s) 145 may then in some cases use such inputs to influence the determined location of the proximity beacon, particularly when there is some uncertainty from the other information 140. The administrator console 145 may also be a front-end device 135 that receives proximity beacon location information, allowing the administrator console 145 to organize and display the proximity beacon location information via a user interface, such the a list interface, a grid interface, or the map interfaces of FIG. 4 and FIG. 5.

Figure 4:
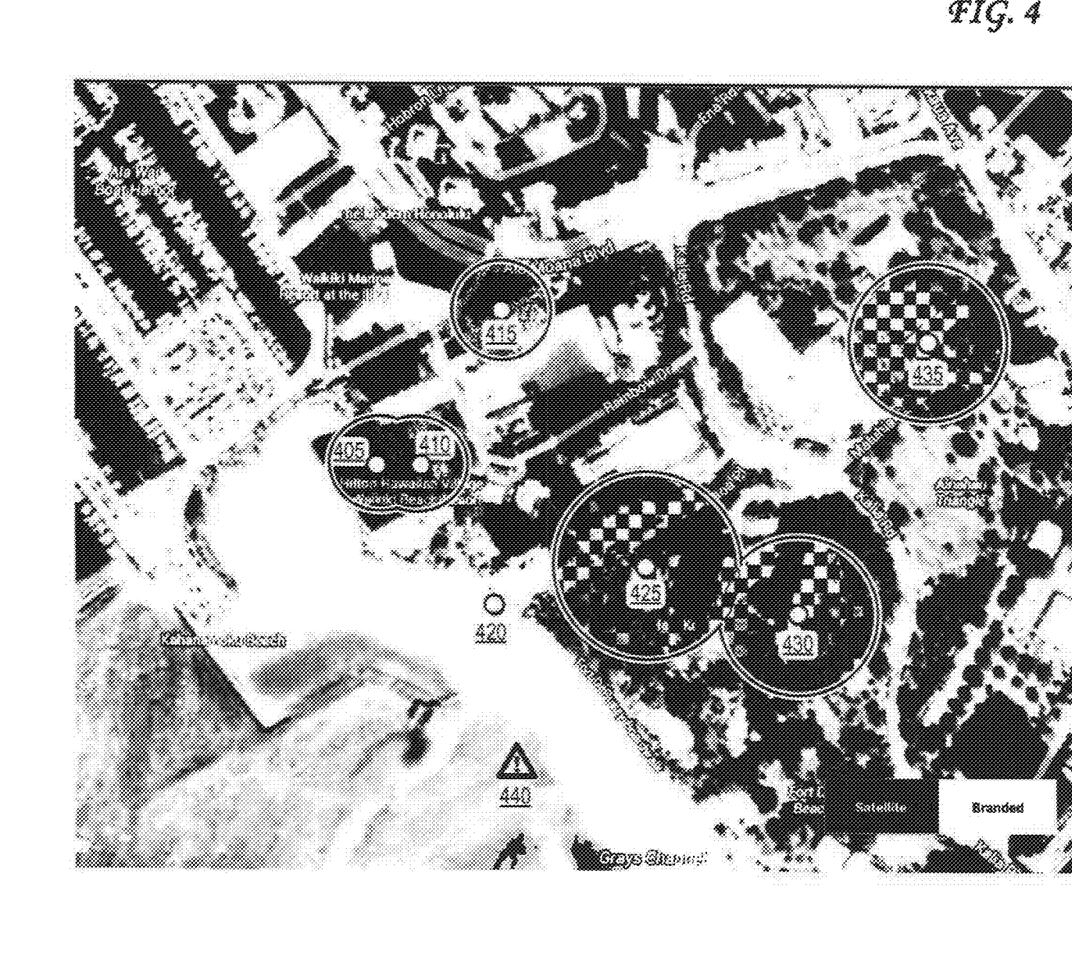
FIG. 4 illustrates a scale map identifying multiple beacon locations.
Figure 5:
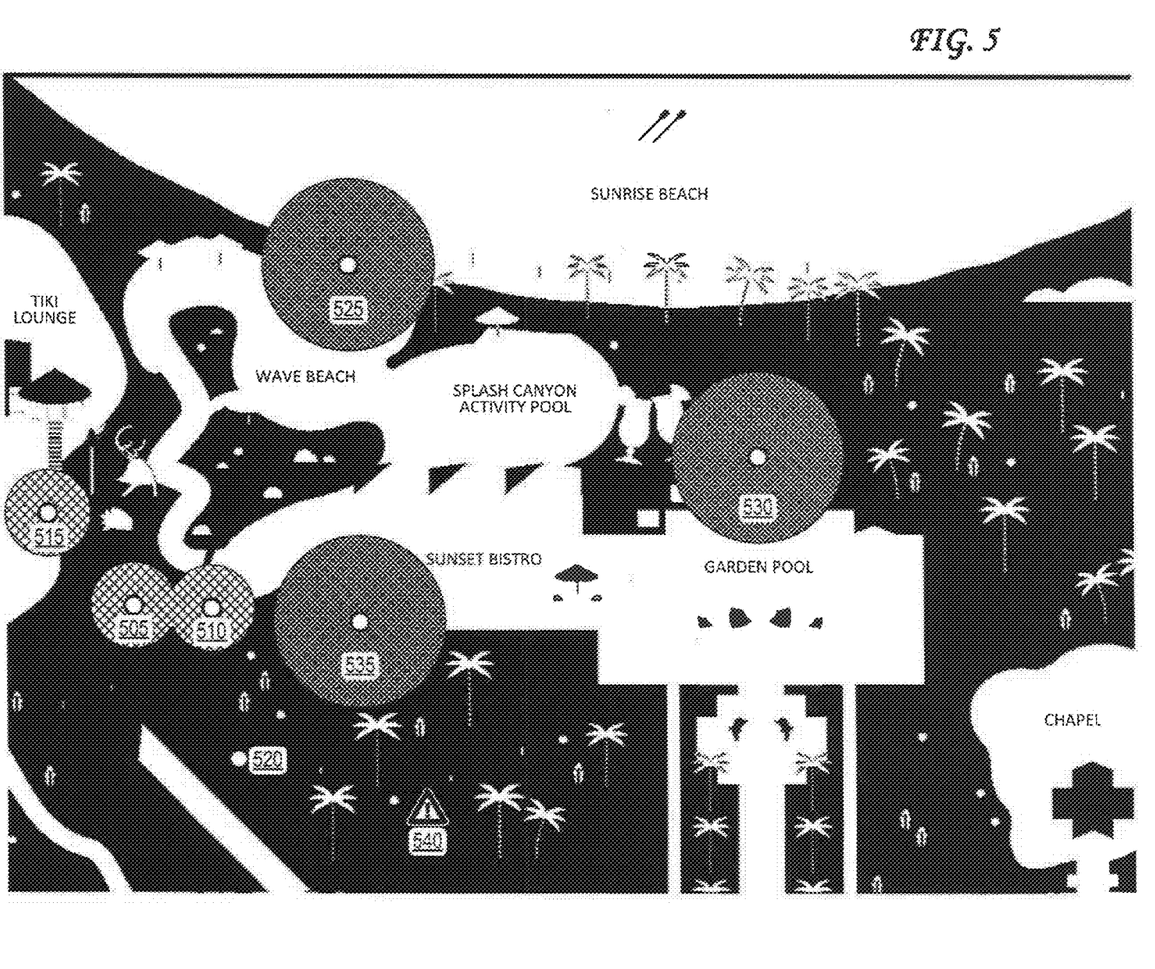
FIG. 5 illustrates a distorted map identifying multiple beacon locations.

A mobile device 110 of a guest of the entertainment venue may be both a data source 105 that provides information 140 to the application servers 125 and a front-end device 135 that receives proximity beacon location information allowing the mobile device 110 to organize and display the proximity beacon location information via a user interface such as the map interfaces of FIG. 4 and FIG. 5. The mobile device 110 may be a wearable device (also known as a "wearable"), meaning any type of mobile electronic device that can be worn on the body or attached to or embedded in clothes and accessories of an individual. Mobile devices 110 can execute an application that shares customer engagement information 140 with a venue's application server(s) 125. Such an application may be embedded within an operating system, produced by a third party, or some combination thereof. The customer engagement data information 140 collected by the application at each mobile device 110 and transmitted to the application server(s) 125 may include a current location, a prior location, a customer wait time in a particular area, a travel time from one area to another, a path taken from one area to another, or some combination thereof.

Figure 2:
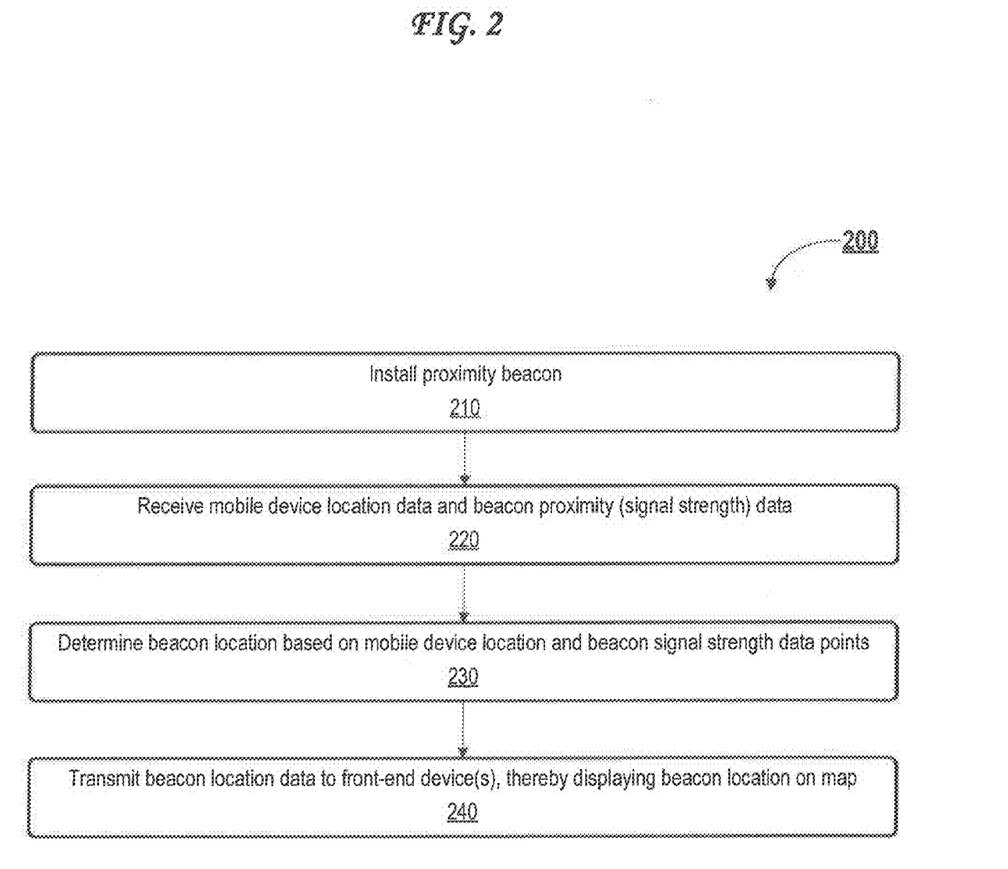
FIG. 2 is a flow diagram illustrating exemplary operations for automatically determining a location of a beacon.

FIG. 2 is a flow diagram illustrating exemplary operations for automatically determining a location of a beacon. In particular, FIG. 2 outlines how the application server(s) 125 gather information 140 and use it to calculate the location of a proximity beacon. It should be noted that the steps of FIG. 2 are exemplary and need not occur consecutively as illustrated in FIG. 2. Various steps illustrated in FIG. 2 and discussed below may occur consecutively, concurrently, or intermittently. Various steps may be occasionally, routinely, or temporarily omitted from the analysis process.

At step 210, a proximity beacon is installed. The proximity beacon is placed in a stationary location or coupled to a moving object, such as a bus, a train, a maintenance staff member, or an entertainer in a costume. The proximity beacon is powered on, for example via battery power or via solar panel power or some combination thereof. The proximity beacon may also be powered via a connection to a power source, such as a power outlet, an external battery, or a generator. This connection may be a wireless charging connection, such as a connection between wireless charging transmitter(s) coupled to the power source and receiver(s) coupled to the proximity beacon. Such wireless charging transmitters and receivers may use inductive, capacitive, electrical, or magnetodynamic coupling. This connection may alternately be a wired connection, such as a connection via a cables between the power source and the proximity beacon. Such cables may feature, at either end, a Universal Serial Bus (USB) jack or port, a power-outlet-style jack or port, or another type of connector appropriate for use with transferring direct current or alternating current. The proximity beacon itself may also include a jack or port that couples with an end of the cable, such as a USB jack or port, a power-outlet-style jack or port, or another type of connector appropriate for use with transferring direct current or alternating current.

Figure 3A:
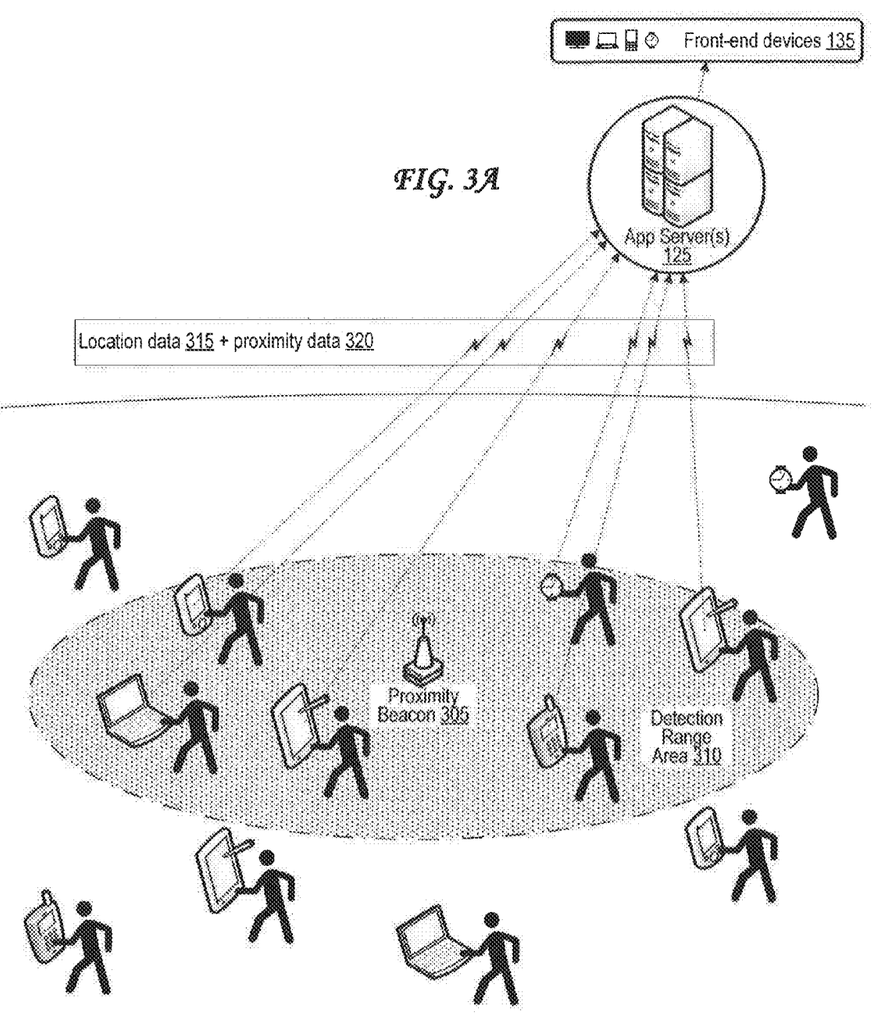
FIG. 3A illustrates mobile devices in a proximity beacon's detection range area transmitting location data and proximity data to an application server.
Figure 3B:
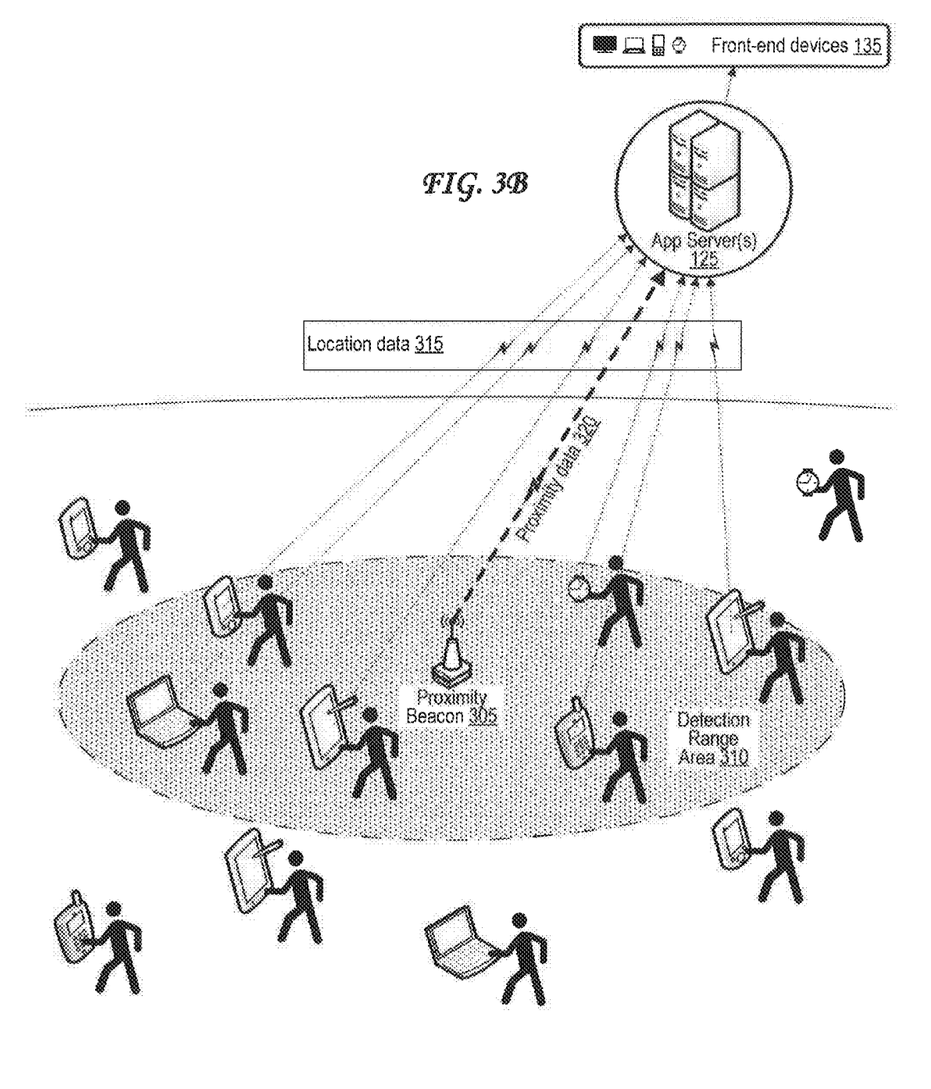
FIG. 3B illustrates mobile devices in a proximity beacon's detection range area transmitting location data to an application server while the corresponding proximity beacon transmits proximity data to the application server.

At step 220, the application server(s) 125 receive location data from mobile devices 110 within a detection range area of the proximity beacon that was installed in step 210. An exemplary detection range area 310 with a variety of mobile device 110 inside is illustrated in FIG. 3A and FIG. 3B. The location data from the mobile devices 110 may be obtained via GPS receivers at the mobile devices 110, via cellular triangulation, via Wi-Fi hotspot, or some combination thereof. In some cases, the location data may include information identifying an estimated accuracy level of the location data. At step 220, the application server(s) 125 also receive beacon proximity data identifying signal strength associated with each of those mobile devices 110. The proximity data may originate from the mobile devices 110 and may identify the strength of the proximity beacon's signal at each mobile device 110, as illustrated in FIG. 3A. Alternately, the proximity data may originate from the proximity beacon and may identify the strength of each signal from each mobile devices 110 within the detection range area around the proximity beacon, as illustrated in FIG. 3B. In some cases, the proximity data may be based both on signal strength of the mobile devices 110 at the proximity beacon and on signal strength of the proximity beacon at the mobile devices 110, such as when the proximity data is based on a two-directional data exchange between the mobile devices 110 and the proximity beacon.

At step 230, the application server(s) 125 determine the location of the proximity beacon that was installed at step 210. The proximity beacon's location is determined based on the location data received from the mobile devices 110 as well as the proximity data received from the mobile devices 110 and/or from the installed proximity beacon. For example, the proximity beacon's location may be determined based on triangulation. In some cases, the proximity beacon's location determination may only be a rough estimate, such as when only a mobile device 110 is available to provide location data. The proximity beacon's location may be improved more and more throughout the day based on new data, especially if the proximity beacon does not move during that time. If the proximity data does move, the application server(s) 125 will be able to see that as well, though its determined location might not be quite as precise as a location determined for a proximity beacon that has remained stationary for some time. The proximity beacon's location may also be determined based on additional information 140 as identified in reference to FIG. 1.

At step 240, the application server(s) 125 transmit data identifying the determined location of the proximity beacon to one or more front-end device(s) 135. The front-end device(s) 135 can then display the determined location of the proximity beacon via a map interface such as the map illustrated in FIG. 4, which is a to-scale satellite and street map, or the map illustrated in FIG. 5, which is a distorted cartoonish venue map.

FIG. 3A illustrates mobile devices in a proximity beacon's detection range area transmitting location data and proximity data to an application server.

Wireless devices typically have a relatively spherical, ovoid, or conical transmission area. The proximity beacon 305 of FIG. 3A is illustrated placed on or near the ground, and thus the planar cross-section of its transmission area is illustrated as the circular or ovoid detection range area 310. It should be understood that the detection range area 310 may take a different shape depending on the wireless transmission protocol and type of transmitter used by the proximity beacon 305. For example, a proximity beacon 305 using a directional antenna might have a more conical transmission area, resulting in a more triangular cross section.

Six mobile devices—a laptop, two tablet devices, a wearable device, and two phones or portable media devices—are illustrated within the detection range area 310 of FIG. 3A. Each of these mobile devices 110 wirelessly transmits its location data 315 as part of the information 140 it transmits to the application server(s) 125 as a data source 105. Each of the six mobile devices within the detection range area 310 of FIG. 3A also transmits proximity data 320 to the application server(s) 125, the proximity data 320 identifying a signal strength corresponding to one or more signals received by the mobile device from the proximity beacon.

The location of the proximity beacon 305 may be identified via triangulation. For example, based on the proximity data 320 from each mobile device, a circle or region can be "drawn" around that mobile device's location (from the location data 310 and subject to any identified accuracy level therein) corresponding to the signal strength of the proximity data 320. A point at which all of these circles or regions intersect should thus be the location of the proximity beacon 305. In some instances, signal strength does not have a linear correlation to distance, but it may provide an accurate enough approximation if the mobile device 110 is calibrated, or if enough mobile devices 110 pass within the detection range area of the proximity beacon 305. The location of the proximity beacon 305 may also be identified based on additional information 140 as identified in reference to FIG. 1.

Once the location of the proximity beacon 305 is identified by the application server(s) 125, the application server(s) 125 transmits the location of the proximity beacon 305 to one or more front-end device(s) 135 via communication network 130.

FIG. 3B illustrates mobile devices in a proximity beacon's detection range area transmitting location data to an application server while the corresponding proximity beacon transmits proximity data to the application server.

The mobile devices 110 of FIG. 3B transmit location data 315 to the application server(s) 125 just like in FIG. 3A. The difference between the embodiment of FIG. 3A and the embodiment of FIG. 3B is that the proximity beacon of FIG. 3B transmits proximity data 320 instead of the mobile devices 110 transmitting it. In this case, the proximity data 320 is still based on a signal strength, but it may be based on a signal strength of one or more signals transmitted from each mobile device 110 to the proximity beacon 305. Alternately, it may still be based on signal strength of one or more signals from the proximity beacon to each mobile device 110, but the mobile devices 110 may then report this signal strength back to the proximity beacon 305, which then reports it to the application server(s) 125.

It should be noted that, within the context of either FIG. 3A or FIG. 3B, additional information 140 regarding the proximity beacon 305, such as information about its operating status, may be provided to the application server(s) 135 by the mobile devices 110, by the proximity beacon 305, or some combination thereof. The application server(s) 135 then may optionally transmit some of this additional information on to the front-end devices 135, where it may be overlaid over an output interface such as the map interfaces of FIG. 4 or FIG. 5. This additional information 140 regarding the operating status of the proximity beacon 305 can include information regarding whether the beacon currently on or off, a remaining battery level, an ambient temperature, whether the beacon is currently in motion, whether the beacon is damaged, a wireless protocol used by the proximity beacon, a signal broadcast strength, a signal broadcast interval, a unique identifier for the beacon, a last-reported location of the beacon, and a last date/time that the proximity beacon was sighted. In some cases, the proximity beacon may by identified by a universally unique identifier (UUID), a major version identifier, a minor version identifier, or some combination thereof. For example, each beacon may distinguish itself and its detection range area based at least on its UUID and its major version identifier.

The beacon data ecosystem 100 is thus useful for locating proximity beacons via triangulation and supplying iteratively updated location data to front-end device(s) 135. By collecting this information the application server(s) can also detect (and alert staff) to a number of potential issues. The issues may include if mobile devices start concurrently reporting multiple significantly different locations for the beacon, it could mean that someone is attempting to clone/spoof the beacon at another location; if mobile devices start consistently reporting a significantly different location for the beacon, this may indicate that someone has physically moved the beacon; if mobile devices stop reporting seeing the beacon when within the area where they should be reporting seeing it, this is an indication that the beacon has failed, is no longer functioning correctly, has been reconfigured, or has been removed; there are some different permutations of these use cases based on whether the beacon is connected and able to report any of this information itself; from an administrative control venue map, alerts can be displayed and the different icon representing the beacons with each warning can be visually highlighted.

FIG. 4 illustrates a scale map identifying multiple beacon locations.

The map of FIG. 4 is a satellite-view to-scale map that identifies streets. The map of FIG. 4 also illustrates various proximity beacon locations and corresponding detection range areas, which are illustrated as circles. Certain proximity beacons have smaller or larger detection range areas, which may correspond to different wireless protocols or different power supplies for each proximity beacon, for example.

In particular, the map of FIG. 4 illustrates overlaid markers identifying proximity beacons 405, 410, and 415 as having small detection range areas. These may be low-power proximity beacons or may use shorter-range wireless protocols such as Bluetooth Low-Energy, Bluetooth Basic Rate, Bluetooth Enhanced Rate, Bluetooth Smart, or some combination thereof. The map of FIG. 4 illustrates overlaid markers identifying proximity beacons 425, 430, and 435 as having large detection range areas. These may be high-power proximity beacons or may use somewhat longer-range wireless protocols such as certain IEEE 802.11 Wi-Fi protocols or even light-based, microwave-based, audio-based, or radio-wave-based protocols.

Because proximity beacons 405 and 410 are close enough together that their detection range areas overlap, the map interface of FIG. 4 illustrates their two detection range areas as joined into a single collective detection range area. Similarly, proximity beacons 425 and 430 are also close enough that their detection range areas overlap, and the map interface of FIG. 4 illustrates their two detection range areas as joined into a single collective detection range area as well. It should be understood that this is joining of overlapping detection range areas is an optional feature and may be omitted either for all detection range areas or for certain detection range areas. For example, a map interface might join overlapping detection range areas only when the corresponding proximity beacons broadcast via the same wireless protocol.

Proximity beacon 420 is illustrated on the map interface of FIG. 4 without a detection range area. This may indicate that the proximity beacon's signal broadcasting has been disabled since being located. Proximity beacon 440 is illustrated on the map interface of FIG. 4 as a warning symbol without a detection range area. This may indicate that the proximity beacon has been moved, has run out of power, or has been damaged. For example, proximity beacon 440 appears to be located near water, so it may have sank underwater or been otherwise damaged by water.

According to the map of FIG. 4, proximity beacons 405 and 410 are located near the "Hilton Hawaiian Village Waikiki Beach Resort." Proximity beacon 415 is located near "Ala Moana Boulevard." Proximity beacon 420 is located on the beach between "Kahanamoku Beach" and "Grays Channel" near the "Hilton Hawaiian Village Waikiki Beach Resort." Proximity beacon 425 is located near "Paoa Place." Proximity beacon 430 is located between "Paoa Place" and "Kalia Road." Proximity beacon 435 is located near "Maluhia Road." Proximity beacon 440 is located in or near the water just off of "Fort DeRussy Boardwalk" between "Kahanamoku Beach" and "Grays Channel."

FIG. 5 illustrates a distorted map identifying multiple beacon locations.

The map of FIG. 5 is an illustrated venue map showing different points of interest within a venue, such as "Tiki Lounge," "Wave Beach," "Sunset Bistro," "Splash Canyon Activity Pool," "Garden Pool," "Sunrise Beach," and "Chapel." The venue map of FIG. 5 may be distorted so that certain areas are automatically illustrated at a closer scale (i.e., more "zoomed in") than other areas. This differs from a "pinch and zoom" implementation that is popular in many mapping solutions or mobile devices. In particular, areas identified as having located proximity beacons may be illustrated at a closer, more "zoomed in" scale (e.g., a 1:100 scale), while areas not identified as having located proximity beacons may be illustrated at a farther, more "zoomed out" scale (e.g., a 1:10 scale). Each "area" may be of uniform scale, or may have a gradual increase/decrease in scale internally, or some combination thereof. The areas could be segmented internally as well. For example, a sub-area including the proximity beacon location marker 535 may be illustrated at a closer scale (e.g., a 1:5 scale) than an area including the proximity beacon location marker 510 (e.g., a 1:15 scale), or vice versa. When a proximity beacon moves, the area around it can automatically adjust scale along with its movements. Such movements can be accidental, such as when a proximity beacon falls from a perch and rolls down a hill, or can be intentional, such as when a proximity beacon is coupled to a bus or train or costume/outfit worn by a staff member.

In an alternative embodiment, the illustrated map of FIG. 5 may simply be drawn at a single scale without any localized distortions.

The map of FIG. 5 illustrates overlaid markers identifying proximity beacons 505, 510, and 515 as having small detection range areas. These may be low-power proximity beacons or may use shorter-range wireless protocols such as Bluetooth Low-Energy, Bluetooth Basic Rate, Bluetooth Enhanced Rate, Bluetooth Smart, or some combination thereof. The map of FIG. 5 illustrates overlaid markers identifying proximity beacons 525, 530, and 535 as having large detection range areas. These may be high-power proximity beacons or may use somewhat longer-range wireless protocols such as certain IEEE 802.11 Wi-Fi protocols or even light-based, microwave-based, audio-based, or radio-wave-based protocols.

Because proximity beacons 505 and 510 are close enough together that their detection range areas overlap, the map interface of FIG. 5 illustrates their two detection range areas as joined into a single collective detection range area. It should be understood that this is joining of overlapping detection range areas is an optional feature and may be omitted either for all detection range areas or for certain detection range areas. For example, a map interface might join overlapping detection range areas only when the corresponding proximity beacons broadcast via the same wireless protocol.

Proximity beacon 520 is illustrated on the map interface of FIG. 5 without a detection range area. This may indicate that the proximity beacon has been disabled after having already been located. Proximity beacon 540 is illustrated on the map interface of FIG. 5 as a warning symbol without a detection range area. This may indicate that the proximity beacon has run out of power or has been damaged. For example, proximity beacon 540 appears to be located in a forested area, so it may have been damaged by animals or may have run out of batteries after being lost.

The maps of FIG. 4 and FIG. 5 may be interactive when displayed at the front-end device 135 and may update periodically based on updates from the application server(s) 125 and/or upon inputs received at the front-end device 135. For example, the maps may be zoomed in and out by the front-end device 135. Furthermore, the locations of each of the proximity beacons are iteratively refined and updated automatically on the venue map each time the beacon is sighted by a mobile application of a mobile device 110 and that mobile device 110 (and/or the corresponding proximity beacon) reports back to the application server(s) 125.

Other maps besides the maps of FIG. 4 and FIG. 5 can be used. For example, maps may specific to a point of interest at a venue, or to a region of a venue, or to a floor plan of an indoor area.

The effective detection radius for each proximity beacon may be displayed on the maps of FIG. 4 or FIG. 5. When a proximity beacon is first deployed, a detection radius may be estimated based on the signal strength of the beacon. For dimensionally accurate map views, a range may be illustrated in the map, such as for example in the form of the circles of FIG. 4 and FIG. 5, which represent where a mobile device 110 can "stand" to detect the beacon. The beacon range may be represented on the map as a circle as in FIG. 4 or FIG. 5, or may also be illustrated as a polygon, an oval, a portion of a circle or oval, or some combination thereof.

The exact detection area of each beacon may be iteratively refined using crowd-sourcing techniques. In some instances, the latitude and longitude location measurements of devices that report detecting a proximity beacon can be correlated with the latitude and longitude location measurements of mobile devices that don't report detecting the beacon to determine the bounds of the proximity beacon's detection range area. This can also be done with a single mobile device in motion, for example by detecting when the mobile device enters the proximity beacon's detection range area and when the mobile device exits the proximity beacon's detection range area. For this reason, a staff member installing the proximity beacon might help "set up" the beacon by turning on a mobile device and walking nearby the mobile device, optionally in and out of its detection range area, so that the proximity beacon's location can be automatically detected. The location will then be gradually updated and refined as more mobile devices enter and exit the detection range area of the proximity beacon.

Mobile proximity beacons may be effectively managed using the maps of FIG. 4 and FIG. 5. A beacon or sensor may be attached to a person of interest (i.e., a person in a character costume associated with the venue) moving around the venue may be tracked, or a method of transportation (bus, train) moving around the venue may be tracked. The mobile proximity beacons may be initially configured to be identified as mobile proximity beacons rather than stationary proximity beacons, so that an administrator seeing the map interface of FIG. 4 or FIG. 5 can understand that he/she need not be alarmed if the proximity beacon's location has changed. The beacon crowd-sourcing location technique may be used to automatically track movements of the mobile proximity beacon based on the mobile devices that enter and exit the detection range area of the mobile proximity beacon along the way. The mobile proximity beacons coupled to moving objects may be identified as mobile during installation (e.g. via an identifier in the UUID, major version, or minor version), and may be highlighted differently on an administrative map of the venue, for example by being identified by a different icon or a different color.

The map interfaces of FIG. 4 and FIG. 5 may be configured to generate alerts when movements above a predetermined threshold are detected in a stationary proximity beacon, for example to prevent theft of the proximity beacon or to identify accidental movements. The map interfaces of FIG. 4 and FIG. 5 may be configured to not generate alerts when a mobile proximity beacon coupled to a moving object moves, since such movements may be expected behavior. An alert may also be generated if the beacon is reported as being actively broadcasting when it should be turned off or vice versa. An alert may also be generated if a proximity beacon is detected in an area it should not be in, which may be useful to detect if a bus takes a wrong turn, or if a staff member enters a restricted area, or to detect if a train has been derailed, or to detect if a proximity beacon has failed or has been spoofed. Some proximity beacons may further be associated with restricted areas, such as staff-only areas, and a map interface may trigger an alert if any mobile devices enter the detection range areas of such proximity beacons.

Figure 6:
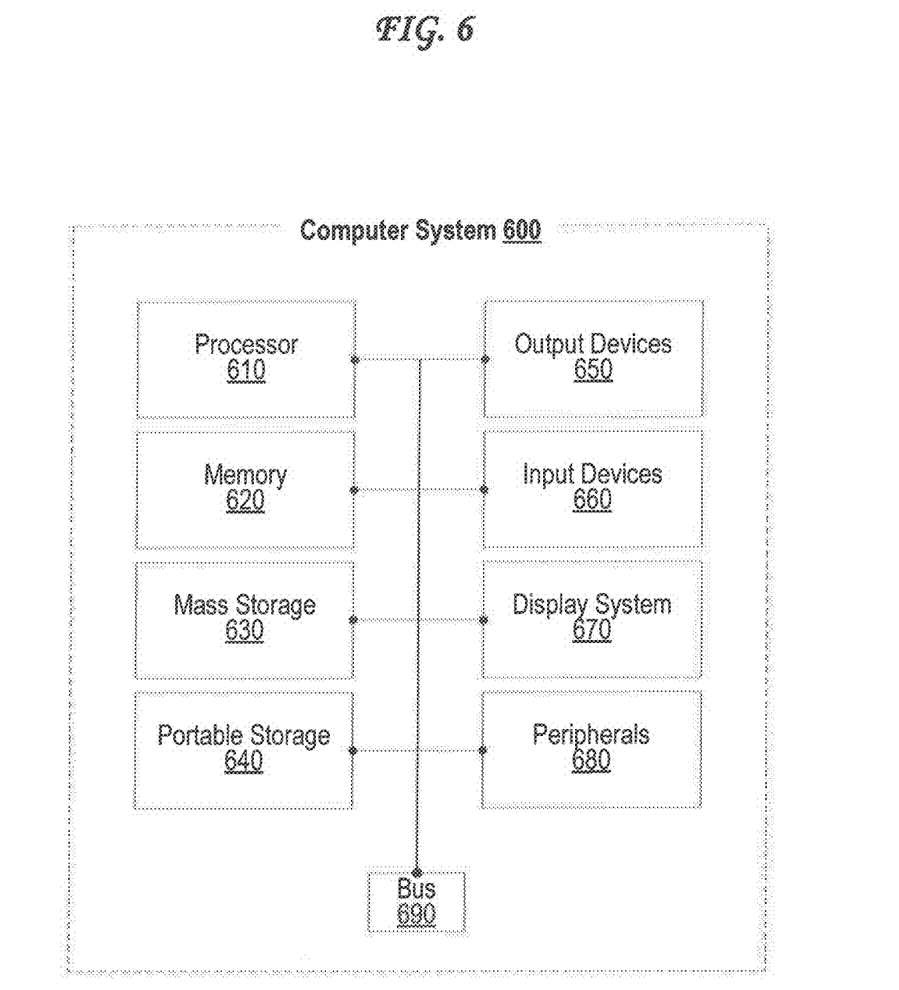
FIG. 6 is a block diagram of an exemplary computing system for implementing the present technology.

FIG. 6 illustrates an exemplary computing system 600 that may be used to implement an embodiment of the present invention. For example, any of the computer systems or computerized devices described herein may, in at least some cases, be a computing system 600. The computing system 600 of FIG. 6 includes one or more processors 610 and memory 610. Main memory 610 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 610 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 610.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD), a plasma display, an organic light-emitting diode (OLED) display, an electronic ink display, a projector-based display, a holographic display, or another suitable display device. Display system 670 receives textual and graphical information, and processes the information for output to the display device. The display system 670 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 600 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 600 may be part of a multi-computer system that uses multiple computer systems 600, each for one or more specific tasks or purposes. For example, the multi-computer system may include multiple computer systems 600 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 600 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for proximity beacon management, comprising:
   receiving, at a server and from a mobile device within a range of a proximity Beacon, a location of the mobile device;
   Receiving, at the server and from the mobile device, proximity information Identifying a signal strength of a signal that the mobile device received from the proximity beacon;
   receiving, at the server and from one of a set of devices that includes the mobile device and the proximity beacon, beacon battery information, the beacon battery information identifying a battery level of the proximity beacon;
   identifying, at the server, a location of the proximity beacon within a venue based on the received location of the mobile device and the received proximity information; and
   transmitting, from the server to a front-end device, the location of the proximity beacon and the beacon battery information, thereby displaying the location of the proximity beacon and the battery level of the proximity beacon overlaid over a map of the venue displayed via a display of the front-end device.

2. The method of claim 1, wherein the location of the mobile device is generated by the mobile device based on at least one of Global Positioning System (OPS) data, cellular signal triangulation, or Wi-Fi hotspot location data.

3. The method of claim 1, wherein mobile device executes a software application that transmits the location of the mobile device and the proximity information.

4. The method of claim 1, further comprising receiving, at the server, secondary proximity information from the proximity beacon, the secondary proximity information identifying a secondary signal strength of a secondary signal that the proximity beacon received from the mobile device.

5. The method of claim 4, wherein identifying the location of the proximity beacon within the venue is further based on the secondary proximity information.

6. The method of claim 1, wherein the map of the venue is distorted and includes a first area that is distinct from a second area, wherein the first area is drawn at a first scale and the second area is drawn at a second scale, wherein the first scale is distinct from the second scale.

7. The method of claim 1, wherein the map of the venue is to scale.

8. The method of claim 1, further comprising:
   identifying that the location of the proximity beacon has changed; and
   transmitting an alert dataset to the front-end device identifying that the location of the proximity beacon has changed, thereby outputting an alert at the front-end device.

9. The method of claim 1, further comprising iteratively improving an accuracy of the location of the proximity beacon based on additional location information and additional proximity information received from one or more additional mobile devices.

10. The method of claim 1, wherein the proximity beacon is coupled to a moving object.

11. The method of claim 1, wherein the proximity beacon is identified via a universally unique identifier (UUID), a major version identifier, a minor version identifier, or a combination thereof.

12. The method of claim 1, further comprising receiving range information identifying the range of the proximity beacon.

13. The method of claim 12, wherein transmitting the location of the proximity beacon to the front-end device includes transmitting the range information to the front-end device, thereby displaying the range of the proximity beacon overlaid over the map of the venue.

14. A system for beacon management using a server, the system comprising:
   a communication transceiver communicatively coupled to a mobile device, the communication transceiver receiving proximity information and a location of the mobile device from the mobile device, the proximity information identifying a signal strength of a signal that the mobile device received from a proximity beacon, the communication transceiver also receiving beacon battery information from one of a set of devices that includes the mobile device and the proximity beacon, the beacon battery information identifying a battery level of the proximity beacon;
   a memory; and
   a processor coupled to the memory and to the communication transceiver, wherein execution of instructions stored in the memory by the processor including:
   identifying a location of the proximity beacon within a venue based on the received location of the mobile device and the received proximity information, and
   transmitting the location of the proximity beacon and the beacon battery information to a front-end device, thereby displaying the location of the proximity beacon and the battery level of the proximity beacon overlaid over a map of the venue displayed via a display of the front-end device.

15. The system of claim 14, wherein the proximity beacon includes a wireless transmitter that transmits at least one of Bluetooth signals, IEEE 802.11 Wi-Fi signals, radio signals, microwave signals, light signals, audio signals, or other electromagnetic signals.

16. The system of claim 14, wherein the location of the mobile device is based on at least one of Global Positioning System (GPS) data, cellular signal triangulation, or Wi-Fi hotspot location data.

17. The system of claim 14, further comprising a moving object, wherein the proximity beacon is coupled to the moving object.

18. A non-transitory computer-readable storage medium, having embodied thereon a program executable by a processor to perform a method for beacon management, the method comprising:

receiving, from a mobile device within a range of a proximity beacon, a location of the mobile device;

receiving, from the mobile device, proximity information identifying a signal strength of a signal that the mobile device received from the proximity beacon;

receiving, from one of a set of devices that includes the mobile device and the proximity beacon, beacon battery information, the beacon battery information identifying a battery level of the proximity beacon;

identifying a location of the proximity beacon within a venue based on the received location of the mobile device and the received proximity information; and transmitting the location of the proximity beacon and the beacon battery information to a front-end device, thereby displaying the location of the proximity beacon and the battery level of the proximity beacon overlaid over a map of the venue displayed via a display of the front-end device.

\* \* \* \* \*